US008700412B2

(12) United States Patent
Hansen

(10) Patent No.: US 8,700,412 B2
(45) Date of Patent: *Apr. 15, 2014

(54) METHODS AND SYSTEMS FOR COORDINATING POOLED FINANCIAL TRANSACTIONS

(71) Applicant: The Western Union Company, Englewood, CO (US)

(72) Inventor: Kurt Hansen, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,107

(22) Filed: Aug. 2, 2013

(65) Prior Publication Data

US 2014/0032404 A1    Jan. 30, 2014

Related U.S. Application Data

(63) Continuation of application No. 11/685,666, filed on Mar. 13, 2007, now Pat. No. 8,515,772, which is a continuation of application No. 10/391,502, filed on Mar. 17, 2003, now Pat. No. 7,225,154.

(51) Int. Cl.
*G06Q 10/00* (2012.01)
*G06Q 40/00* (2012.01)

(52) U.S. Cl.
USPC ................................. 705/1; 705/35

(58) Field of Classification Search
USPC ....................................... 705/1, 35
See application file for complete search history.

(56) References Cited

U.S. PATENT DOCUMENTS

| 6,339,766 B1* | 1/2002 | Gephart | 705/44 |
| 7,117,178 B2* | 10/2006 | Thompson | 705/40 |
| 2002/0138573 A1* | 9/2002 | Saguy | 709/204 |
| 2003/0111527 A1* | 6/2003 | Blossom | 235/380 |
| 2004/0162775 A1* | 8/2004 | Winklevoss et al. | 705/36 |
| 2008/0046361 A2* | 2/2008 | Bent et al. | 705/40 |

OTHER PUBLICATIONS

Lepkowski, Sonja; "Charitable reminder annunity trust or charitable gift annuity"; Jan. 2000; CPA Journal, v70n1, pp. 60-61, ISSN: 0732-8435.*
PR_Newswire; "Corporate Donations Help American Red Cross Comfort Victims of Tropical Storm Isidore . . ."; Oct. 1, 2002, DCTU06401102002.*
Ebeling, Ashlea; "Charitable Choice"; Jun. 10, 2002, Forbes pp. 232-236, CODEN: FORBA5, ISSN: 0015-6914.*

* cited by examiner

*Primary Examiner* — Edward Chang
(74) *Attorney, Agent, or Firm* — Kilpatrick Townsend & Stockton LLP

(57) ABSTRACT

Methods and systems are provided for processing a financial transaction. A set of conditions is received that define circumstances for execution of the financial transaction. Funds are collected for each of a plurality of partial payments prior to satisfaction of the set of conditions, with at least two of the partial payments being collected from different persons. The collected funds are accumulated for support of the financial transaction until satisfaction or failure of the set of conditions.

19 Claims, 6 Drawing Sheets

METHODS AND SYSTEMS FOR COORDINATING POOLED FINANCIAL TRANSACTIONS

CROSS-REFERENCE TO RELATED APPLICATION

This application is a continuation of U.S. Patent application Ser. No. 11/685,666, entitled "METHODS AND SYSTEMS FOR COORDINATING POOLED FINANCIAL TRANSACTIONS," filed Mar. 13, 2007, which is a continuation of U.S. Patent application Ser. No. 10/391,502, entitled "METHODS AND SYSTEMS FOR COORDINATING POOLED FINANCIAL TRANSACTIONS," filed Mar. 17, 2003, the entire disclosure of which is incorporated herein by reference, for all purposes, as if fully set forth herein.

BACKGROUND OF THE INVENTION

This application relates generally to financial transactions. More specifically, this application relates to methods and systems for coordinating pooled financial transactions.

There are numerous applications in which it is desirable for a group of people to pool their financial resources and to use the pooled resources towards a financial transaction. This may be illustrated with a specific example that is sometimes referred to in the Detailed Description of the Invention below when describing how certain aspects of the invention may be implemented in specific embodiments. Consider the case of John, who has learned that his father is terminally ill. John's father lives in a different country than John and John would like to visit his father, but is unable to afford the purchase of an airline ticket. There are various relatives who would be willing to provide financial support, but their ability to do so is complicated by the fact that they are geographically disperse, with some living in different countries than either John or his father. The ability of the various relatives to pool their financial resources is thus further inhibited by the fact that those resources are not even available in the same currency. There is a need for a simple way to coordinate the purchase of the airline ticket among the various parties.

Similar needs may arise in various other circumstances in which a group of people wish to pool their financial resources. Accordingly, there is a general need to provide a simple mechanism for coordination of pooled financial transactions.

BRIEF SUMMARY OF THE INVENTION

Embodiments of the invention thus provide methods and systems for processing financial transactions that greatly simplify pooling of financial resources among multiple people. Some embodiments make use of an architecture that permits access to a host system that implements methods of the invention. The architecture, which may also be used for various other applications, may include direct interfaces with geographically distributed transaction devices and may include various remote interfaces, including an Internet interface, a DTMF interface, and/or a cable interface. Equivalent functionality is provided with each of the interfaces, and the availability of a large number of geographically distributed transaction devices permits diverse interaction with the host system, even in areas or by persons without easy access to one of the remote interfaces. The host system maintains criteria that define when the transaction is to be executed or aborted, and coordinates the collection of partial payments made by different persons, thereby effecting the pooling aspect of the transaction.

In one specific set of embodiments, a method is provided for processing a financial transaction. A set of conditions is received at the host system that define circumstances for execution of the financial transaction. Funds are collected for each of a plurality of partial payments prior to satisfaction of the set of conditions, with at least two of the partial payments being collected from different persons. In some cases, one of the partial payments may be made by the person who establishes the set of conditions. The collected funds are accumulated for support of the financial transaction until satisfaction or failure of the set of conditions.

There are various types of conditions that may be used. For example, in one embodiment, the set of conditions comprises a total transaction amount. In another embodiment, the set of conditions comprises a time limitation. Still other types of conditions may be imposed, including some that rely on the occurrence or non-occurrence of an external event. There are also various ways in which the funds may be collected, including by charging a card account, such as from a credit card, debit card, stored value card, and the like, and/or by receiving cash.

Upon satisfaction of the set of conditions, at least some of the accumulated funds may be transferred to execute the financial transaction, a process that may include performing a currency exchange of the funds. In some instances, a notification that the accumulated funds have been transferred may then be provided. In addition, an excess of the accumulated funds that are unused may be refunded in some instances. Such a refund may also be made upon failure of the set of conditions to return unused accumulated funds.

In another specific set of embodiments, a method is also provided for processing a financial transaction. A set of conditions is received at the host system that define a beneficiary to the financial transaction and circumstances for execution of the financial transaction. Prior to satisfaction of the set of conditions, funds are collected for a first partial payment initiated at a first location and for a second partial payment initiated at a different second location. A determination is made whether to transfer the collected funds to the beneficiary by determining whether the set of conditions has been satisfied. The types of conditions, methods for collecting funds, and actions taken after satisfaction or failure of the set of conditions are varied, and include those mentioned above.

The methods of the present invention may be embodied in a computer-readable storage medium having a computer-readable program embodied therein for directing operation of the host system. The host system may include an input device, a communications system, a processor, and a storage device. The computer-readable program includes instructions for operating the host system to process a financial transaction in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for processing pooled financial transactions. As used herein, a "pooled" financial transaction includes contributions to the financial transaction from at least two different persons. In some instances, the pooling may occur over a period of time, as well as through multiple persons. One example of such an instance is where one of the persons makes contributions at different points in time as that person's financial resources become available, such as through receipt of wages or other payments. Coordination of such pooled financial transactions is achieved in embodiments of the invention by use of a money-transfer architecture that has the capacity to be accessed in geographically disperse areas.

Figure 1A:
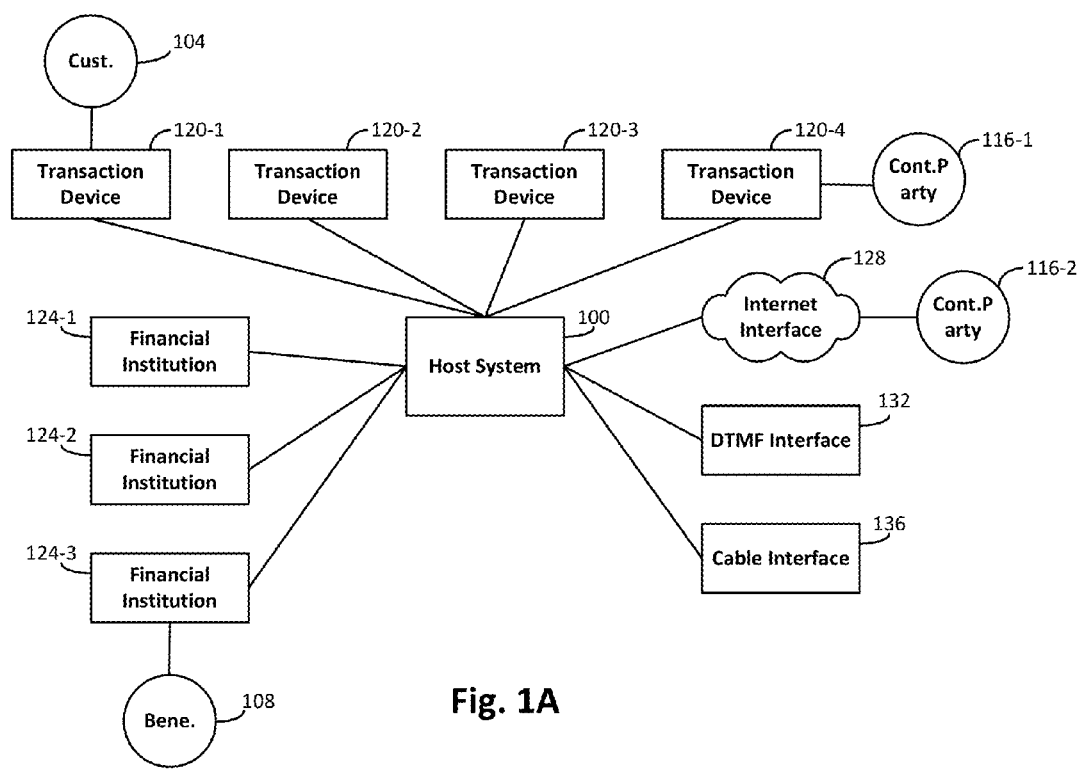
FIG. 1A is a block-diagram representation of a partial architecture for implementing pooled transactions in accordance with an embodiment of the invention.

An illustration of one possible architecture that may be used to enable such embodiments is illustrated with the schematic diagram in FIG. 1A. Coordination of the pooled financial transaction is effected by a host system 100, which is in communication with one or more interfaces that may be used for interaction. The geographical dispersion for access to the host system 100 may be effected by using transaction devices 120 that are geographically distributed. Each transaction device 120 may be configured as a stand-alone device for collecting information for defining the pooled financial transaction and the conditions under which it is to be executed, in addition to performing other functions. The connections between the host system 100 and the transaction devices 120 may be maintained with any communications protocol known to those of skill in the art, including electronic, optical, and other communications protocols. Because of the sensitive nature of the financial information that may be exchanged, such communications protocols generally incorporate strong encryption schemes.

In other instances, the system may permit collection of relevant information by the host system 100 with an interface that is itself accessible from geographically disperse locations. Examples of interfaces that may be used include an Internet interface 128, which may, for example provide a World Wide Web interface for staging the pooled transaction. Another interface that may be provided is a DTMF interface 132, which includes a processor for decoding DTMF tones from a touch-tone telephone. Such tones may be used in combination with a recorded-voice interface to collect information for staging the pooled transaction. A further interface that may be provided is a cable interface 136, which includes a processor for decoding cable signals for staging the pooled transaction.

The transaction devices 120 and other interfaces permit direct interaction with the host system 100 by persons involved with the pooled transaction. Indirect interaction is also possible, such as by using a financial institution 124 as an intermediary, but this is not required in embodiments of the invention. In such instances, the financial institution 124 is interfaced with the host system 100. Such an arrangement permits the financial institution 124 to accept funds transferred from the host system 100 as part of the pooled transaction and/or to provide funds to the host system 100 in accordance with instructions from one of the persons involved with the pooled transaction.

Merely by way of example, the use of different components of the architecture may be illustrated with the example of John seeking to purchase an airline ticket outlined in the Background of the Invention. In this example, John is a customer 104 who wishes to make arrangements by which other family members may contribute to his purchase of an airline ticket. Each of the family members who makes a contribution is identified in FIG. 1A as a contributing party 116 and the airline that is to receive the funds as part of the transaction is identified as the beneficiary 108. In FIG. 1A, customer John 104 stages the pooled transaction through interaction with one of the transaction devices 120-1, although it may be staged through any of the other interfaces with the host system 100. A first of the contributing parties 116-1 interacts with a second of the transaction devices 120-4 to submit his contribution. The first and second transaction devices 120-1 and 120-4 may be geographically separate, even being in different countries and/or on different continents. A second of the contributing parties 116-2 instead interacts with the host system 100 through the Internet interface to submit his contribution.

Each of these contributions may be obtained in different ways, depending on the instructions provided by the contributing parties 116 when they make their contributions. In some instances, their contributions may be provided by specifying financial-account information and an amount to be debited from the account. In such instances, the host system 100 uses an interface with one of the financial institutions 124 to debit the amount and apply it to the transaction. The interface with the financial institutions 124 may also be used to execute the transaction by crediting a specified account at a financial institution 124. This is particularly convenient in the case of John's purchase of an airline ticket since the beneficiary 108 is not a natural person. Rather than have the airline send a representative to a specific location to retrieve payment, it may be deposited directly into an account of the airline with instructions to credit it to the specific ticket purchase. For this reason, FIG. 1A shows the beneficiary interacting directly with one of the financial institutions 124-3.

The specific interactions of the customer 104, contributing parties 116, and beneficiary 108 with the system shown in FIG. 1A are merely exemplary. Different combinations of interactions may be more suitable for other types of pooled financial transactions, and are intended also to be within the scope of the invention. Furthermore, the arrangement illustrated schematically in FIG. 1A may be viewed as a portion of a larger communications infrastructure. Such a communications infrastructure provides communications interconnections and protocols for exchanging data among a variety of devices and institutions, in addition to those identified in FIG. 1.

There are numerous different structures that may be used for the transaction devices 120 indicated in FIG. 1A. Examples of such systems are described in detail in copending, commonly assigned U.S. patent application Ser. No. 10/206,661, entitled "MONEY TRANSFER SYSTEMS AND METHODS FOR TRAVELERS," filed Jul. 26, 2002 ("the '661 application"), the entire disclosure of which is herein incorporated by reference for all purposes. For example, local terminals may be used to accept cash, credit cards, checks, debit cards, stored value cards, smart cards, and the like as part of initiating the pooled transaction. The transaction device may also include payout functionality that permits it to print a check, print a money order, credit a stored-value card, and the like. This payout functionality may be used in instances where execution of the pooled transaction comprises performing such a payout, with the payout being collected at the transaction device 120. Examples of such terminals are described in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

Figure 1B:
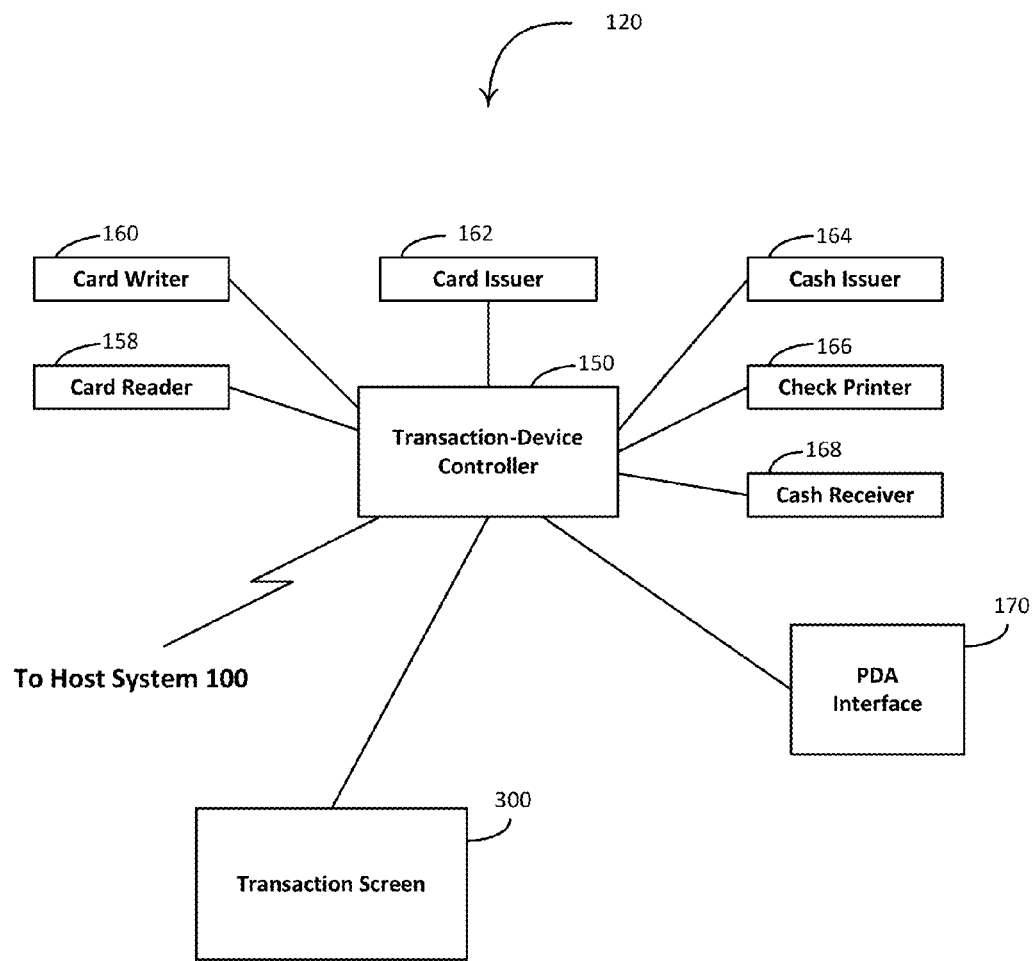
FIG. 1B is a schematic illustration of a device that may be used to collect and/or pay funds in accordance with embodiments of the invention.

One basic structure for the transaction device is shown schematically in FIG. 1B. The components shown may form part of a device that is operated by a clerk in accordance with instructions from a customer, or may be part of a self-service device in which the customer enters instructions directly. Regardless of how the transaction device 120 is configured for operation, it may include a controller 150 that may communicate with various component devices such as a card reader 158, a card writer 160, a card issuer 162, a cash issuer 164, a check printer 166, and a cash receiver 168. The transaction device 120 may include some or all of these devices.

The card reader 158 permits easy entry of customer information when the customer 104 has a card that contains identifying information common to many transactions, such as the customer's name, identification number, and the like. These may be used to populate a transaction screen 300, such as the one described below. Similarly, such an identification card may be used with the card reader by contributing parties 116 and/or beneficiaries 108 to simplify providing identification for participation in the pooled transaction. The card reader 158 may also be used to extract information from credit cards, debit cards, smart cards, stored value cards, and the like in embodiments where the customer 104 or other contributing party 116 wishes to use those instruments as a source of funds for a partial payment towards the pooled transaction. The card writer 160 similarly permits information to be encoded and stored on a variety of similar types of cards. This capability permits the transaction device to pay out funds in accordance with the pooled transaction in some embodiments by adding value to a stored-value card, smart card, and the like. In some cases, cards may be issued to the customers 104, contributing parties 116, and/or beneficiaries 108 using the card issuer 162. For example, a customer card may be issued as part of a registration process of the customer 104, contributing party 116, or beneficiary 108, permitting that person to use the card rather than re-enter identification information for later transfers. The card issuer 162 may also be used to issue cards when making payments to recipients in the form of stored value cards, smart cards, cash cards, and the like. These may then be used at other transaction devices 120 or ATMs to withdraw the funds.

The cash receiver 168 may be used to receive funds from the customer 104 and/or contributing parties 116 in accordance with partial payments that they make. Similarly, the cash issuer 164 may be used to dispense cash directly to the beneficiary 108 after the identity of the beneficiary 108 has been confirmed, such as by having an identification card read by the card reader 158 and entering a personal identification number. Cash payouts may also be made by using the card reader 158 and cash issuer 164 in combination to redeem value from a card having stored value.

The transaction device 120 may also include connections for interfacing with peripheral devices. For example, a PDA interface 170 may permit a PDA device to be coupled to the transaction device 170, allowing instructions for the pooled transaction to be made directly from the customer's PDA, which may conveniently be preprogrammed with various information relating to the transaction, such as account numbers, information on the beneficiary 108, and the like. The PDA interface 170 may similarly be used by contributing parties 116 to provide identification and account information for submitting a partial payment, and by beneficiaries 108 to provide identification and account information for receiving funds in accordance with the pooled transaction. Connections for interfacing with other types of peripheral devices may also be included to offer as much versatility as possible to customers 104, contributing parties 116, and beneficiaries 108 in interacting with the system.

The functionality provided by the transaction devices 120 may in large measure be reproduced with the alternative interfaces, i.e. through the Internet interface 128, DTMF interface 132, and cable interface 136. In such cases, identification information from cards, such as credit cards, debit cards, smart cards, stored-value cards, and the like, is provided through the interface rather than the card itself. Applicable debits and credits in accordance with the pooled transaction are performed through interfacing with the financial institutions 124 to apply those debits and credits to respective accounts held at the financial institutions.

Regardless of the type of interface used by the various parties, the pooled transactions may be effected in similar ways. Examples of transactions effected with the arrangement shown in FIG. 1A are provided by the flow diagram shown in FIG. 2. In this embodiment, the pooled transaction is initiated by the customer 104, who provides relevant information to define the pooled transaction at blocks 204, 208, and 212. This information may be provided at a transaction device 120 as indicated in FIG. 1A, or through any of the other interfaces. Generally, at least three pieces of information are provided in defining the pooled transaction, including beneficiary information at block 204, a total transaction amount at block 208, and conditions for execution of the transaction at block 212. In an alternative embodiment, the conditions may instead be partially or fully specified by the beneficiary 108 instead of by the customer 104. After the transaction information has been entered, the customer 104 may be provided with a transaction identifier that he may then communicate to contributing parties 116 for their use in identifying the pooled transaction.

The beneficiary information provided at block 204 may take the form of providing the name of the beneficiary, a known identification number, or some other identifying information. The use of known identification numbers may be particularly useful for large-volume parties, such as corporations. As such, in the example of John seeking the purchase of an airline ticket, the identification of the beneficiary as the airline may be provided by specifying an identification number provided by the airline. A large beneficiary may have multiple identification numbers that correspond to different departments, such that the specific identification number provided permits more directed targeting of the pooled transaction when it is executed.

The total transaction amount provided at block 208 is used to define the amount of money to be transferred when the transaction is executed. It is possible in some instances for more money to be collected from contributing parties 116 than is actually required for the transaction. This is evident, for example, in the case of John, where multiple relatives may make contributions, being unaware of the size of contributions made by others. Since the airline ticket is for a fixed price, only that amount should be transferred to the airline when sufficient funds have been accumulated; the excess collected funds may be refunded as described further below. In some instances, specification of the transaction amount may include specifying the currency for the transaction amount, particularly where partial payments may be made in multiple currencies.

The execution conditions provided at block 212 are used to define the circumstances under which the transaction is to be executed and/or is to be aborted. In some instances, such as the example of John, execution of the transaction may be desired as soon as a minimum level of accumulated funds have been reached. In other instances, it may be desirable to place a time limit on when the transaction is executed, irrespective of how much money is collected. This may be suitable, for example, in an embodiment where the pooled transaction is to be used for a charitable fund-raising event. In such an instance, the execution condition serves to define a cutoff for the fund-raising period, during which it is desired to collect as much money as possible, not to work towards a goal of a specific level of funds. Defining circumstances under which the transaction is to be aborted may be useful, for example, in applications where there is some time sensitivity to the transaction. This is also evident in the example of John, who may wish to require that the cost of the airline ticket be reached within two weeks, beyond which he will not travel.

In some embodiments, the execution conditions may be subject to change to respond to evolving circumstances. For example, the customer 104 may have the capability of changing the time limit, changing the amount that is to be collected, changing the designation of the beneficiary, and the like. In some instances, the capacity of the customer 104 to change the conditions may be subject to controls to avoid manipulation of the system to defraud contributing parties 116 through the use of unbridled discretion by the customer 104.

The information provided at blocks 204, 208, and 212 is not exhaustive and additional information may also be provided in some embodiments. For example, while in many instances contributions towards the pooling may be accepted from anyone willing to make a contribution, in other instances limitations may be imposed on who acceptable contributing parties are. Such a feature could be used, for example, where John instead wishes to raise funds to purchase a vacation package for his mother and wants to ensure that his mother does not contribute. The ability to specify contributing parties may also be used to simplify making the contribution for those parties. For example, if Mr. Smith is preidentified as a contributing party on two different pooled transactions, he may automatically be presented with options to contribute to those transactions when he is identified by the host system 100. This feature may thus avoid the need for the customer to communicate specific transaction identifiers to contributing parties 116, thereby reducing the possibility of errors resulting from failing to receive the identifiers, mistranscribing them, or other such errors.

Once the pooled transaction has been defined by the customer 104, contributions may be made and accumulated towards the transaction. Such contributions may be made by the customer 104 himself, may be made by contributing parties 116 that have been specifically identified by the customer 104, or may be made by any contributing party 116 to whom the transaction identifier has been communicated. Thus, at block 216 of FIG. 2, a check is made to determine whether a partial payment is being made by the customer 104, and at block 224, a check is made to determine whether a partial payment is being made by a different contributing party 116. In many instances, these checks will be performed in the same fashion, with the customer 104 or contributing party 116 providing information to identify the transaction and providing funds for accumulation towards the transaction. Blocks 216 and 224 are provided separately, however, to emphasize the possibility that a partial payment by the customer 104 at block 216 may be integrated with the procedure for setting up the pooled transaction, while partial payments by a contributing party 116 at block 224 are generally made only after the pooled transaction has been set up by the customer 104. In particular, a field may be provided on the interface for the customer 104 to enter partial payment information while he is providing the transaction details collected at blocks 204, 208, and 212. An example of such a field is provided below in the discussion of FIG. 3A.

If the customer 104 makes a partial payment at block 216, funds for that partial payment are collected at block 220. Similarly, if a contributing party 116 makes a partial payment at block 224, funds for that partial payment are collected at block 228. In some embodiments, only a portion of the partial payment is credited towards the pooled transaction, with a small amount being retained in the form of a service fee. In some embodiments, a receipt may be also be provided when a contribution is made, either by the customer or by the contributing party. Such a feature may be especially desirable where the contribution qualifies for a tax deduction, with the receipts provided to each party making a contribution serving as proof of the tax-deductible payment. In addition, in some embodiments, collection of funds for a partial payment at block 228 may prompt a notification to be sent to the customer 104. Such a notification may help keep the customer 104 well apprised of the status of the collections, and may in some instances identify the contribution party while in other instances will maintain the anonymity of the contributing party. The funds collected at blocks 220 and 228 are collected prior to satisfaction of the conditions established at block 212. There are several advantages to collecting the funds prior to satisfying the conditions. For example, collection at this time ensures that the funds are available for execution of the transaction as soon as the conditions for execution have been met. The alternative of collecting after the conditions have been met runs the risk that committed funds may have become unavailable and that actual execution of the transaction will not be possible.

A check is made at block 232 to determine whether the conditions for execution of the pooled transaction have been met. If so, the transaction is executed by transferring the funds identified at block 208 to the control of the beneficiary 108 at block 236. This may be accomplished by the host system 100 providing instructions to one of the financial institutions to credit an identified account with the funds, or by designating the funds as eligible for recovery by the beneficiary 108. In such instances, the beneficiary 108 may then collect the funds by providing suitable identification through any of the interfaces with the host system 100, including at a transaction device 120 or through one of the remote interfaces, and providing instructions for payment. Such payment may include payment in cash, payment in the form of a stored value card, issuance of a check, credit to a specified account, etc. Often, the transfer of funds at block 236 will be accompanied by providing a notification of the transfer to the customer 104 and/or beneficiary 108. Such notification may be provided by any convenient method, including sending of an email message, a recorded telephone message, a postcard, and the like.

If the amount of the transaction is less than the amount of funds accumulated from different sources, a refund may be provided at block 244. In some instances, the amount refunded is less that the excess funds to account for collection of a service charge for the refund. Also, the refund may be made to different parties according to a default protocol or according to a protocol established by the customer 104 when the pooled transaction was initiated. For example, the excess funds may be refunded entirely to the customer 104, may be refunded to another specifically designated person, may be refunded to each of the contributing parties 116 in proportion to their contributions, etc.

A check is made at block 240 to determine whether specified failure conditions for the pooled transaction have been met, such as would require that the transaction be aborted in accordance with instructions specified by the customer 104 at block 212. If those conditions have been met, such as by passage of a predetermined period of time, without the conditions for execution having been met, the collected funds may be refunded at block 248. Similarly to the refund provided at block 244, the amount returned may be less than the full amount collected to account for collection of a service charge. Also, the parties to whom the refund is made may differ according either to a default protocol or a protocol established by the customer 104. The funds may be refunded entirely to the customer 104, may be refunded entirely to another specifically designated person, may be refunded to each of the contributing parties 116 in proportion to their contributions, etc.

The method continues over time to await partial payments from the customer 104 and/or other contributing party 116. Each time a partial payment is made, at least some of the collected funds are accumulated for support of the financial transaction. This continues until either the conditions for execution or the conditions for failure of the transaction have been met. The fact that the method proceeds over time also highlights the fact that pooling of resources may arise both by pooling resources from a plurality of persons, and by pooling resources from a single person over time. The pooling by a single person over time permits partial payments to be made by that person at different points in time as funds become available, such as through periodic wage receipts. Such pooling over time may thus be used to provide a layaway or similar type of savings program for that person. In some embodiments, the time pooling by a single person is performed in combination with pooling by a plurality of persons.

In some embodiments, the pooling capabilities provided according to embodiments of the invention may be combined with a variety of other financial-services capabilities, such as with the money-transfer capabilities discussed in the '661 application. For example, the combination of such systems could be used by a traveler to coordinate the use of funds while traveling through different countries. For example, a European traveler could use the system to replenish an account with unused funds in British pounds while traveling in the United Kingdom, and later extract funds in euro when traveling in other parts of Europe.

Figure 2:
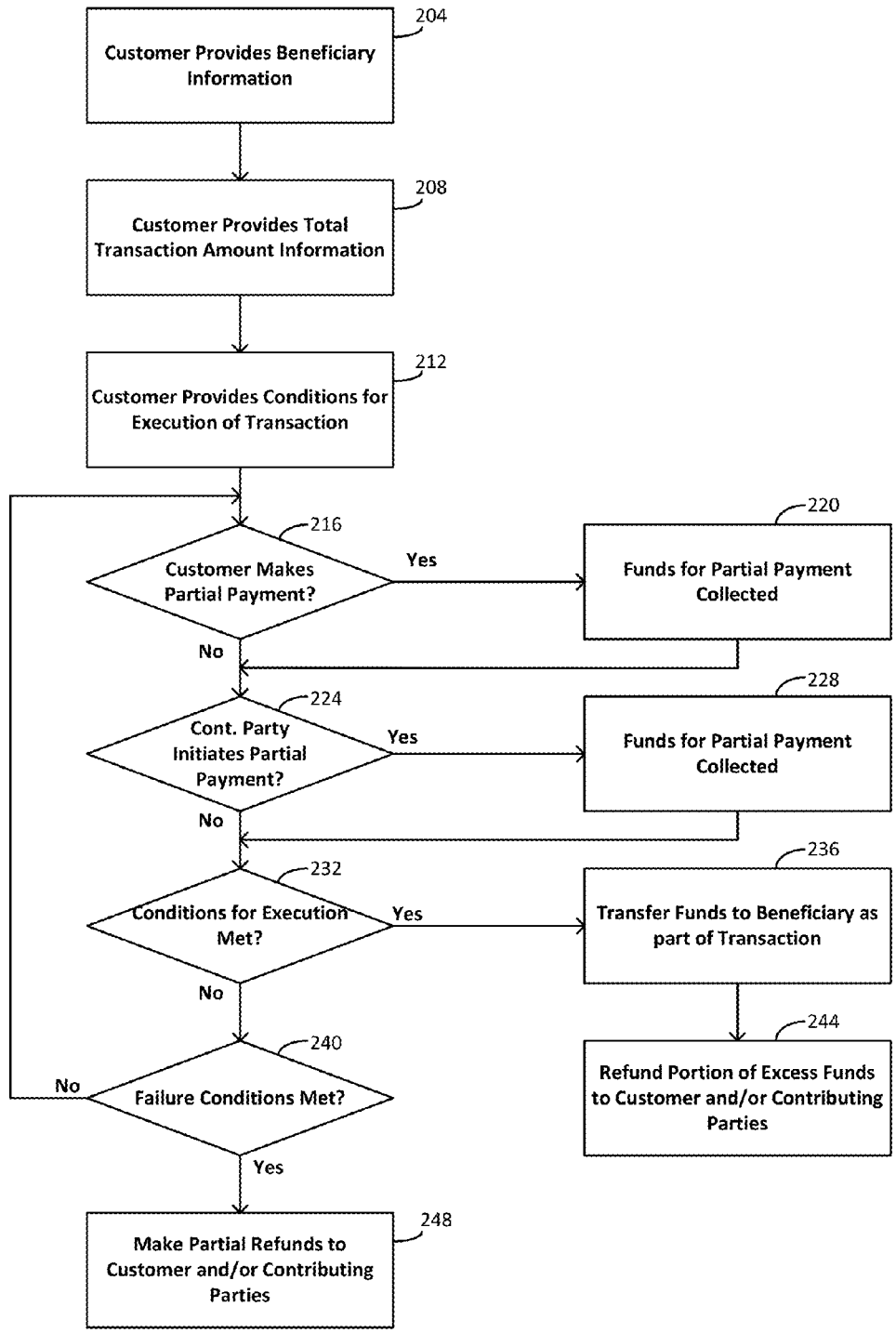
FIG. 2 is a flow diagram illustrating a method for processing a financial transaction in accordance with an embodiment of the invention.
Figure 3A:
FIGS. 3A and 3B are simplified exemplary screen diagrams that may be displayed on a display screen while initiating a financial transaction in accordance with an embodiment of the invention.
Figure 3B:
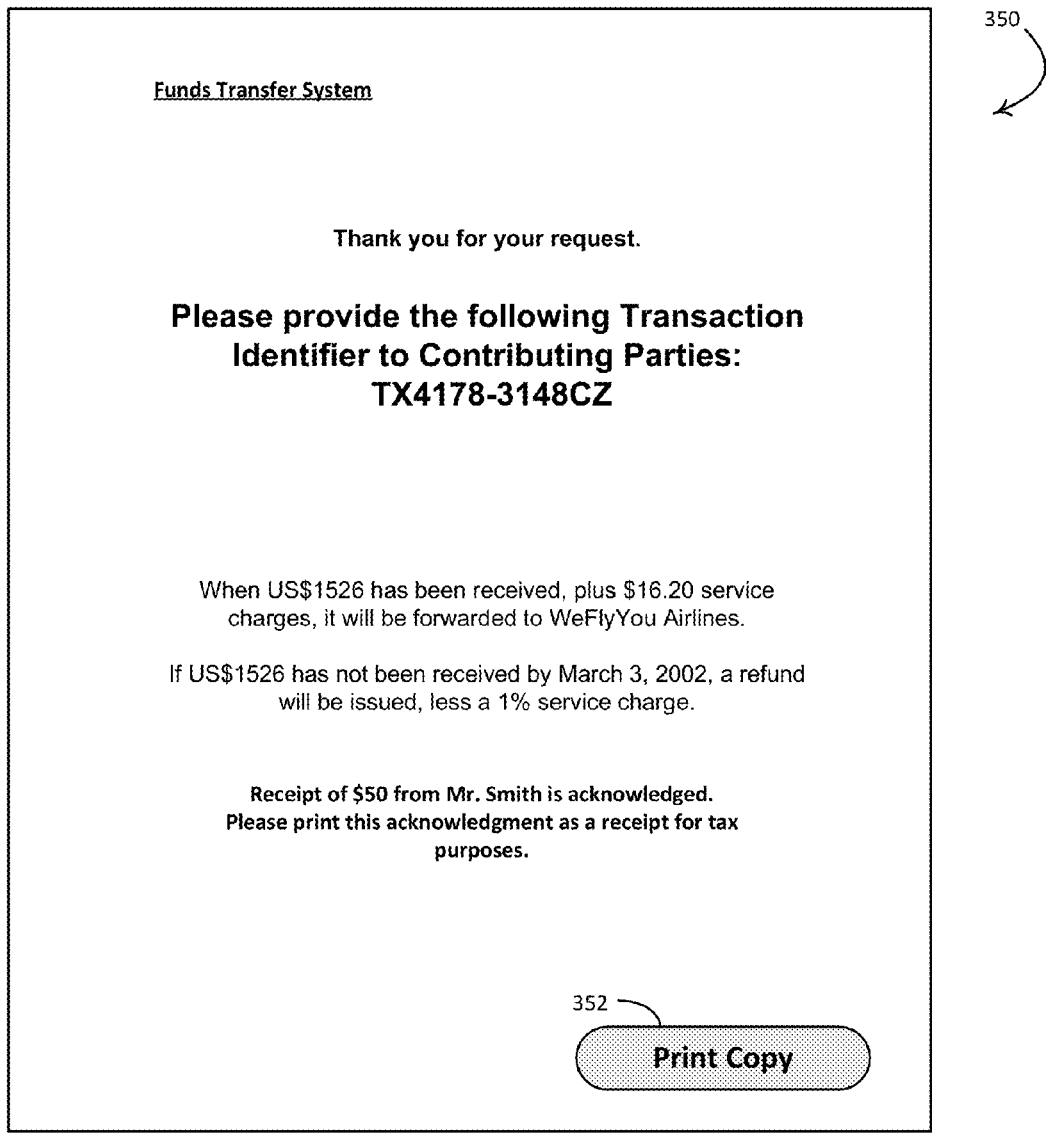

Implementation of the method described with respect to FIG. 2 may be illustrated with the screen shots shown in FIG. 3A and FIG. 3B. These screen shots are examples of what may be shown on a transaction screen 300 that forms part of a transaction device or may be shown on a local monitor for the customer 104 when the customer 104 uses one of the remote interfaces. FIG. 3A provides an example of a screen that may be used by the customer 104 to enter information defining the pooled transaction. For purposes of illustration, the screen is shown in simplified form, and the specific fields shown are not intended to be exhaustive, but rather to illustrate how information regarding the pooled transaction may be received. In embodiments that use other interfaces that do not provide visual screens, such as with a DTMF interface 132, equivalent information may be conveyed through a menu of recorded voice messages, with DTMF responses by the customer 104 being used to collect the desired information.

The screen is shown in two parts. The top part provides fields for entering particulars of the transaction and the bottom part provides fields for entering conditions upon which the transaction is to be executed or aborted. In the top portion, the total amount of the transaction may be entered at field 304. As previously mentioned, this specifies the amount of money actually to be transferred. In cases where there is no predetermined amount, so that all of the accumulated funds will be transferred, instructions may be provided to enter "ALL" or some equivalent designation. Provision for specifying the currency in which the amount to be transferred is expressed may be provided with a drop-down menu 306 such as shown, or with an equivalent feature. A field 308 is also provided for identification of the beneficiary 108, which may be provided in terms of a name or known identification number as previously described.

Some of the fields may comprise optional fields, which may be selected in the illustrated embodiment by activating a check box 301. Other fields may provide alternatives to be selected, as indicated through the use of radio buttons 302 in the illustration. An example of an optional field is field 310, which permits entry of a partial payment amount by the customer 104, such as discussed in connection with block 216 of FIG. 2. The partial payment amount may be accompanied by field 312 for identifying the source to be used for collecting the partial payment amount, as at block 220 of FIG. 2. In many instances, this source will specify an account, such as by providing routing and account numbers to identify a specific account at a financial institution 124. In other instances, provision may be included for indicating that cash will be provided, such as through a cash receiver 168 at a transaction device 120, that a credit, debit, stored-value, or other type of card will be provided to a card reader 158 at a transaction device 120, or that some other mechanism accepted by the system for payment will be provided.

An example of a field that includes alternatives to be chosen is shown for the identification of where funds are to be transferred upon satisfaction of the transaction conditions. It is possible to select from a predetermined list 314 of transaction-device locations, as shown with a drop-down menu, or to enter a different destination in field 311. The alternative destination specified in field 311 may identify an account, such as by providing routing and account numbers. In some instances, this field 311 may be populated automatically by the system upon identification of the beneficiary 108, particularly where the beneficiary 108 is a person registered with the system and has previously provided account information.

An optional field 316 may also be provided for text that the customer 104 wishes to accompany the transaction when it is executed. In the example of John seeking to purchase an airline ticket, this field may be used to specify a ticket number provided by the airline to which the funds are to be applied when they are received.

The examples of fields in FIG. 3A is not intended to be exhaustive and other limitations on the transaction may be specified in some embodiments. For example, provision could be made to limit the amounts provided with each separate contribution by a contributing party. Such limits could specify a minimum amount that must be provided to make a contribution and/or could specify a maximum amount that would be accepted as a contribution.

The fields in the bottom portion of the screen 300 illustrate different types of conditions that may be implemented, but the illustrations of them are not intended to be exhaustive and other types of conditions may be imposed in alternative embodiments. Each of the conditions is optional, and may thus be selected with respective check boxes 301. A first type of condition that may be implemented is a time-based condition. Such a time-based condition may be implemented by requiring that funds be collected prior to a specified date, as indicated with field 318, or that they be collected within a certain specified time period. A second type of condition that may be implemented is a funds-based condition. Such a funds-based condition may be implemented by requiring that a certain level of funds be collected, as indicated with field 320. Usually, a funds-based condition will specify the currency in which the condition is to be applied, such as by providing a drop-down menu 322 for specification of the currency. In other embodiments, a funds-based condition may be more specific, requiring, for example, that certain levels of funds be collected from specific contributing parties 116. Still other types of conditions may be imposed in other embodiments, some of which may be based on the occurrence of external events. For example, in an embodiment, the pooled transaction may be intended for the purchase of a home and a condition may be imposed for execution of the transaction that a relevant interest rate be below a certain value at the time the required funds are collected. Still other external events may be used to provide conditions, such as stock indices, and the like.

Field 324 provides an example of a failure condition, the occurrence of which may trigger abortion of the transaction at block 240 of FIG. 2. In the illustrated example, the failure condition is satisfied when the required funds level has not been reached by a specified date. It is, thus, an example of a time-based failure condition. Other failure conditions may include funds-based failure conditions, as well as failure conditions that are dependent on the occurrence or non-occurrence of external events. The screen 300 includes an indication that there may be a service charge imposed if satisfaction of the failure condition results in a refund to the customer 104 and/or contributing parties 116.

Once the customer has completed the fields on the screen 300 to define the pooled transaction and conditions for its execution and/or failure, a submission button 326 may be activated to convey the information to the host system 100. The host system 100 may then generate a receipt 350 for presentation on the display, such as shown in FIG. 3B. The receipt 350 not only summarizes the transaction and the execution and failure conditions, but also provides a transaction identifier. The transaction identifier may be provided by the customer to various persons by the customer 104, with a request that they act as contributing parties 116. This identifier may then be requested by the host system through an interface with the contributing parties 116 to direct their contributions appropriately to the pooled transaction. In addition, in instances where the customer 104 has provided a contribution at the time of initiation, the receipt may include a specific acknowledgment of the amount received and an instruction to print the receipt for possible tax-filing purposes. A print button 352 may be provided to print a copy of the receipt when the pooled transaction is initiated at a transaction device, or may be printed by the customer 104 locally when a remote interface is used.

Figure 4:
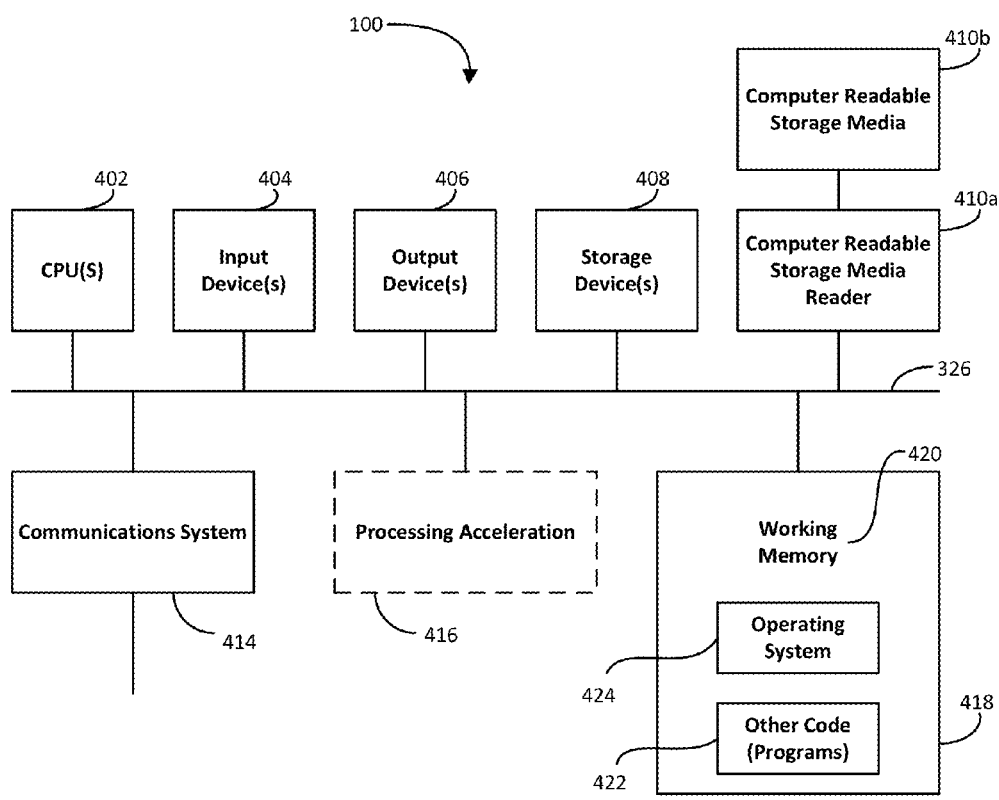
FIG. 4 is a schematic illustration of a computer system on which methods of the invention may be embodied.

FIG. 4 provides a schematic illustration of a structure that may be used to implement the host system 100. FIG. 4 broadly illustrates how individual system elements may be implemented in a separated or more integrated manner. The host system 100 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the transaction devices 120, the Internet interface 128, the DTMF interface 132, the cable interface 136, and the financial institutions 124 to implement embodiments as described above.

The host system 100 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method comprising:
   receiving, at a host computer system, information that defines a beneficiary and a first condition for execution of a financial transaction;
   receiving, at the host computer system, information regarding collection of a plurality of partial payments, wherein each of the plurality of partial payments is prohibited from originating from a particular source and from exceeding a maximum amount;
   recording, by the host computer system, an accumulation of collected funds for support of the financial transaction;
   determining, by the host computer system, whether the first condition has been satisfied;

causing, by the host computer system, the accumulation of collected funds to be transferred to the beneficiary upon or after satisfaction of the first condition.

2. The method recited in claim 1 wherein at least two of the partial payments are collected from different entities.

3. The method recited in claim 1 wherein the first condition comprises the accumulation of collected funds equaling or exceeding a total transaction amount.

4. The method recited in claim 1 wherein the first condition comprises a particular time being reached.

5. The method recited in claim 1 wherein at least one of the plurality of partial payments comprises a payment from a card account.

6. The method recited in claim 1 further comprising receiving, at the host computer system, a second condition, wherein the second condition represents a change in the first condition.

7. The method recited in claim 1 wherein the particular source is selected from a group consisting of:
cash;
check;
credit;
debit; and
stored-value.

8. The method recited in claim 1 further comprising generating, by the host computer system, a notification to each entity which provided funds for each of the plurality of partial payments.

9. The method recited in claim 1 further comprising:
receiving, at the host computer system, information that defines a second condition for termination of the financial transaction;
determining, by the host computer system, whether the second condition has been satisfied; and
terminating, by the host computer system, the financial transaction if the second condition is determined to have occurred prior to satisfaction of the first condition.

10. The method recited in claim 9, wherein terminating the financial transaction comprises causing the accumulation of collected funds to be refunded to contributors.

11. A non-transitory computer-readable storage medium having a computer-readable instructions stored thereon, the computer-readable instructions executable by a processor to at least:
receive information that defines a beneficiary and a first condition;
receive information regarding collection of a plurality of partial payments, wherein each of the plurality of partial payments is prohibited from exceeding a maximum amount;
record an accumulation of collected funds for support of the financial transaction;
determine whether the first condition has been satisfied;
causing the accumulation of collected funds to be transferred to the beneficiary upon or after satisfaction of the first condition.

12. The non-transitory computer-readable storage medium recited in claim 11 wherein at least two of the partial payments are collected from different entities.

13. The non-transitory computer-readable storage medium recited in claim 11 wherein the first condition comprises the accumulation of collected funds equaling or exceeding a total transaction amount.

14. The non-transitory computer-readable storage medium recited in claim 11 wherein the first condition comprises a particular time being reached.

15. The non-transitory computer-readable storage medium recited in claim 11 wherein at least one of the partial payments comprises a payment from a card account.

16. The non-transitory computer-readable storage medium recited in claim 11 wherein the first condition is defined by the beneficiary.

17. The non-transitory computer-readable storage medium recited in claim 11 wherein the computer-readable instructions are further executable by the processor to at least:
receive a second condition, wherein the second condition represents a change in the first condition.

18. The non-transitory computer-readable storage medium recited in claim 11 wherein each of a plurality of partial payments is prohibited from originating from a particular source.

19. A method comprising:
receiving, at a host computer system, information that defines a beneficiary and first condition for execution of the financial transaction;
receiving, at the host computer system, information, regarding collection of a plurality of partial payments, wherein each of the plurality of partial payments is prohibited from exceeding a maximum amount;
recording, by the host computer system, an accumulation of collected funds for support of the financial transaction
determining, by the host computer system, whether the first condition has been satisfied;
causing, the host computer system, the accumulation of collected funds to be transferred to the beneficiary upon or after satisfaction of the first condition.

\* \* \* \* \*